United States Patent [19]

Tejima et al.

[11] Patent Number: 4,981,352
[45] Date of Patent: Jan. 1, 1991

[54] PROJECTION DISPLAY DEVICE

[75] Inventors: Yasuyuki Tejima; Takashi Iizuka; Hideki Nakamura, all of Tokyo, Japan

[73] Assignee: Asahi Kogaku Kogyo Kabushiki Kaisha

[21] Appl. No.: 443,328

[22] Filed: Nov. 30, 1989

[30] Foreign Application Priority Data

Dec. 14, 1988 [JP] Japan .................................. 63-315635

[51] Int. Cl.$^5$ ............................................. G02B 27/00
[52] U.S. Cl. .......................................... 353/31; 353/81; 353/37; 350/286; 350/424; 350/397; 350/173; 350/359
[58] Field of Search ....................... 353/34, 31, 30, 33, 353/37, 81, 122; 350/424, 286, 447, 359, 397, 445, 173

[56] References Cited

U.S. PATENT DOCUMENTS

| | | | |
|---|---|---|---|
| 2,178,245 | 10/1939 | Schwarz | 350/286 |
| 4,127,322 | 11/1978 | Jacobson et al. | 353/37 |
| 4,185,893 | 1/1980 | Ogawa et al. | 350/424 |
| 4,345,258 | 8/1982 | Tsai et al. | 353/31 |
| 4,500,172 | 2/1985 | Gagnon et al. | 353/31 |
| 4,735,491 | 4/1988 | Takahashi | 350/447 |
| 4,827,334 | 5/1989 | Johnson et al. | 350/173 |
| 4,842,374 | 6/1989 | Ledebuhr | 353/31 |
| 4,850,685 | 7/1989 | Kamakura et al. | 350/397 |
| 4,861,142 | 8/1989 | Tanaka et al. | 353/34 |
| 4,895,433 | 1/1990 | Takahashi et al. | 350/447 |

FOREIGN PATENT DOCUMENTS

| | | |
|---|---|---|
| 61-210301 | 9/1986 | Japan . |
| 62-91916 | 4/1987 | Japan . |
| 62-208016 | 9/1987 | Japan . |
| 63-10128 | 1/1988 | Japan . |

Primary Examiner—William A. Cuchlinski, Jr.
Assistant Examiner—William C. Dowling

[57] ABSTRACT

A projection display device having a dichroic prism having at least two incident surfaces and an emergence surface, separate color image emitting elements being disposed in opposing relation to the two incidence surfaces, respectively, of the dichoric prism, and a projection lens being disposed in opposing relation the emergence surface of the dichroic prism, so that color images produced by the separate color image emitting elements are combined by the dichroic prism and projected onto a screen through said projection lens, wherein the end surface of said dichroic prism which is closer to said projection lens comprises a curved surface.

22 Claims, 4 Drawing Sheets

PROJECTION DISPLAY DEVICE

BACKGROUND OF THE INVENTION

1. Field of the Invention

The present invention relates to a projection display device of the type in which separate color images are combined and projected as of an enlarged picture image.

2. Description of Related Art

A known type of projection display device consists of a liquid crystal color projector wherein R (red), G (green) and B (blue) illuminating light rays are applied to three liquid crystal panels which give R, G and B color separation information, respectively, to obtain separate R, G and B images. The images are then combined and projected as an enlarged color image through a projection lens.

FIG. 4 is a schematic view of a conventional liquid crystal color project or which employs a dichroic prism and dichroic mirrors for separation and combination (synthesis) of light rays, as described above. Liquid crystal panels 12, 13 and 14 for R, G and B are disposed in opposing relation to three surfaces (defined as incidence surfaces), respectively, of a dichroic prism 11 which is in the shape of a rectangular parallelepiped. A projection lens 15 is disposed so as to face the remaining surface (defined as an emergence surface E) of the prism. A R (red) reflecting dichroic mirror 12a, a G (green) reflecting dichroic mirror 13a and a B (blue) reflecting dichroic mirror 14a are disposed at the respective incidence sides of the liquid crystal panels 12, 13 and 14 at 45° to the corresponding optical axes. Illuminating light rays are directed onto these dichroic mirrors 12, 13 and 14. The illuminating light rays are obtained by passing light from a white light source 16 through a collimating lens (condenser lens) 17 and thereby producing parallel rays of light. The parallel light rays are applied successively to the B reflecting dichroic mirror 14a, a total reflecting mirror 18, the G reflecting dichroic mirror 13a, a total reflecting mirror 19 and the R reflecting dichroic mirror 12a as shown in FIG. 4.

The dichroic prism 11 is provided with a B (blue) reflecting film 11a and a R (red) reflecting film 11b which are positioned at 45° to the corresponding optical axes and which are perpendicular to each other. Both the reflecting films 11a and 11b transmit G (green) light.

In the liquid crystal color projector, when the liquid crystal panels 12, 13 and 14 are irradiated with parallel light rays produced by the white light source 16 and the collimating lens 17 while these panels 12, 13 and 14 are being switched on the basis of the corresponding color information, red, green and blue light rays respectively transmitted by the liquid crystal panels 12, 13 and 14 enter the dichroic prism 11. The incident light rays are combined (superposed) through the B and R reflecting films 11a and 11b provided in the prism 11, and the combined picture image emerges from the emergence surface E of the prism 11 and is projected in the form of an enlarged image on a screen 20 through the projection lens 15. The reference numeral 22 denotes an aperature (diaphragm) of the projection lens 15.

In this liquid crystal color projector, parallel rays are employed as illuminating light so as to enable the dichroic mirrors and prism to perform optimally. A telecentric lens is generally employed as the projection lens 15 to avoid color shifting due to an incident angle difference.

However, in the above-described conventional projection display device employing a dichroic prism and dichroic mirrors the contrast of the image projected on the screen 20 is low.

The inventors of the present invention investigated the causes of the low contrast projected image in the prior art and, as a result, have found that in the projection display device employing the dichroic prism 11 the respective outer surfaces of the dichroic prism 11 and the liquid crystal panels 12, 13 and 14 are defined by flat surfaces which are parallel to each other. The resulting surface reflection that occurs at the dichroic prism, results in a low contrast image.

FIG. 5 illustrates the cause of low contrast of the projected image in the conventional display devices. Assuming that the upper and lower light rays of a bundle of rays (shown by the solid line) emerging from the point A on the liquid crystal panel 12 (13, 14) are a1 and a2, respectively. The reflected light (shown by the dotted line) of a2 at the emergence surface E (the end surface closer to the screen 20) of the dichroic prism 11 reaches the point B on the liquid crystal panel 12 and is then reflected again therefrom. The bundle of rays passing through the dichroic prism 11, the projection lens 15 and the aperture 22 reaches the screen 20 as shown by the arrow A'. On the other hand, the upper and lower rays b1 and b2 of another bundle of rays (shown by the one-dot chain line) emerging from the point B on the liquid crystal panel 12 pass through the same optical paths as those shown by the dotted lines and reach the screen 20 as shown by the arrow B'. Thus, it is clear that the light rays shown by the dotted lines and one-dot chain lines coincide with each other in a telecentric optical system, although in the figure the dotted and one-dot chain lines are drawn separately from each other for sake of the clarity. Accordingly, the reflected light rays shown by the dotted lines cause a ghost image, which causes a low contrast in the projected image.

Since the low contrast is caused by the surface reflection as described above, it can theoretically be prevented by providing antireflection films on the dichroic prism 11 and the liquid crystal panel 12, respectively. However, it is impossible to obtain perfect antireflection films and employment of antireflection films leads to an increase in the production cost. The problem of low contrast may be solved to a certain extent by interposing a liquid having a specific refractive index between the emergence surface E of the dichroic prism 11 and the projection lens 15, using the technique proposed in Japanese Unexamined Patent Publication No. 62-208016 in regard to a color projector comprising a CRT. However, provision of a liquid having a specific refractive index in a space will complicate the arrangement of the device and also cause an increase in the cost.

SUMMARY OF THE INVENTION

In view of the above-described situation, it is a primary object of the present invention to provide a projection display device employing a light rays combining optical element and a projection lens which is designed so that low contrast of the projected image is prevented in a simple manner.

The present invention prevents low contrast of the projected image by utilizing a part of a projection lens used to project the combined image emerging from the light rays combining optical element onto a screen.

More specifically, the present invention provides a projection display device of the type in which separate color image emitting elements, for example, liquid crystal panels or CRT's, are disposed in opposing relation to at least two incidence surfaces, respectively, of a light rays combining optical element for image picture combination, for example, a dichroic prism. A projection lens is disposed in opposing relation to an emergence surface of the light rays combining optical element so that the images emitted from the separate color image emitting elements are combined through the light rays combining optical element and projected onto a screen through the projection lens, wherein the end surface of the light rays combining optical element which is closer to the projection lens comprises a curved surface.

This curved surface, by definition, acts like a lens. Therefore, the projection is designed with the lens effect of the curved surface taken into consideration. In other words the curved surface of the light rays combining optical element is considered to be a part of the projection lens.

The arrangement that separate color image emitting elements are disposed in opposing relation to two surfaces, respectively, of the light rays combining optical element is adopted in a special case where separate images of only two different colors are combined.

A lens element that constitutes the end portion of the projection lens which is closer to the light rays combining optical element may be adhered (cemented) to the emergence surface of the light rays combining element instead of forming the end surface of the light rays combining element which is closer to the projection lens into a curved surface. This is more practical than forming a curved surface on the light rays combining optical element. The light rays combining optical element and the lens adhered thereto are preferably made of the same material in order to eliminate reflection at the interface of the surfaces.

The curved surface of the light rays combining optical element or the lens that is adhered to the optical element is preferably a concave surface or lens. Theoretically, low contrast of the projected image due to surface reflection can also be prevented by a convex surface or lens, but a concave surface or lens is more effective than a convex surface or lens having the same radius of curvature.

BRIEF DESCRIPTION OF THE DRAWINGS

The present invention will be described below in detail by way of examples and with reference to the accompanying drawings, in which;

FIG. 2 is a graph showing various aberration curves of the optical system shown in FIG. 1;

FIG. 5 shows the cause of low contrast in the prior art.

DETAILED DESCRIPTION OF THE INVENTION

Figure 1:
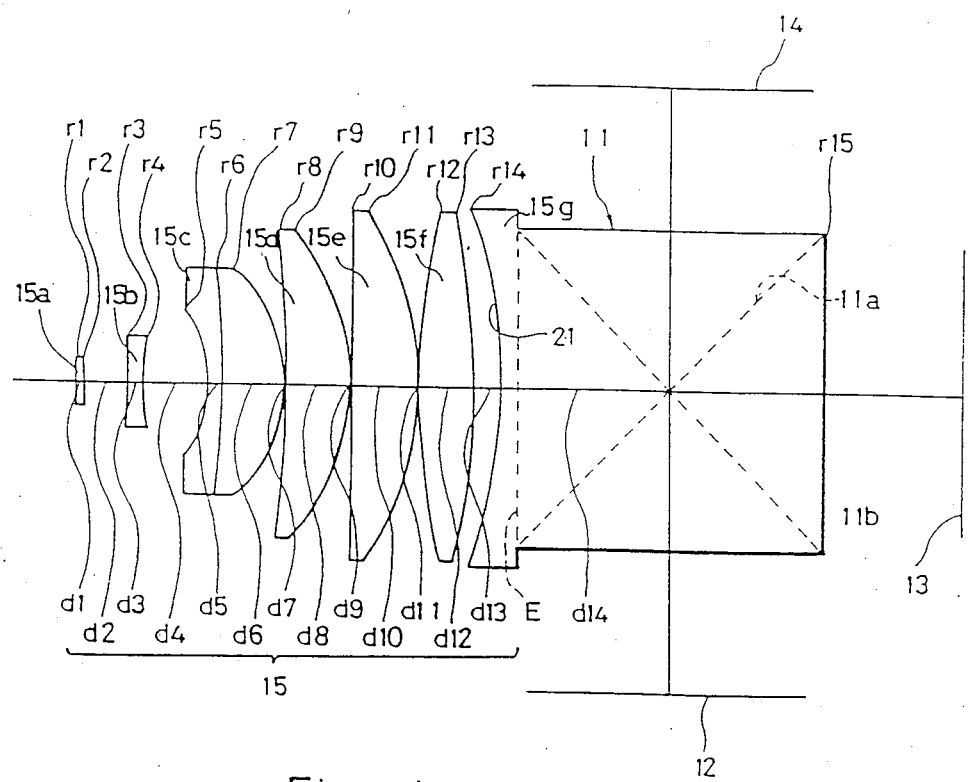
FIG. 1 shows the optical system of the projection display device according to the present invention.
Figure 4:
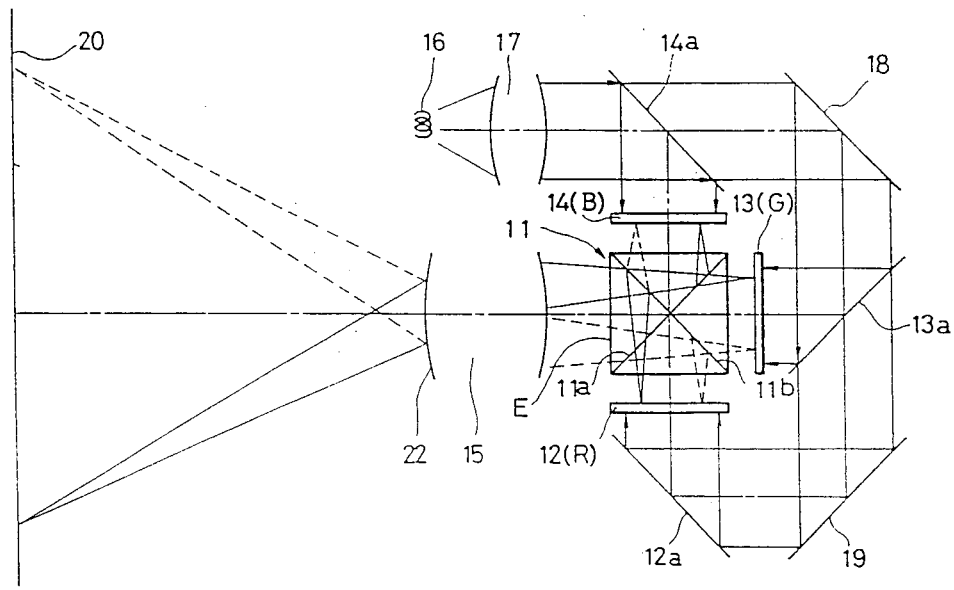
FIG. 4 shows the optical system of the conventional liquid crystal projection display device.

In FIG. 1, illustration of conventional components shown in the prior art of FIG. 4 are omitted. That is, the R, G and B reflecting dichroic mirrors 12a to 14a as well as components between the white light source 16 and the total reflecting mirror 19, are omitted and the same components as those shown in FIG. 4 are denoted by the same reference numerals.

In the FIG. 1 embodiment, the projection lens 15 is shown as a telecentric lens system that comprises a first lens group 15a composed of a positive lens element, a second lens group 15b composed of a negative lens element, an adhered lens group 15c, three positive lens groups 15d, 15e, 15f and a negative lens element 15g. The negative lens element 15g is a plano-concave lens which is disposed such that the flat surface thereof is directed toward the emergence surface E of the dichroic prism 11 and the concave surface is directed toward the screen 20, the flat surface of negative lens element 15g being adhered to the dichroic prism 11. The negative lens element 15g is formed from the same optical material as that used to form the dichroic prism 11.

Figure 3:
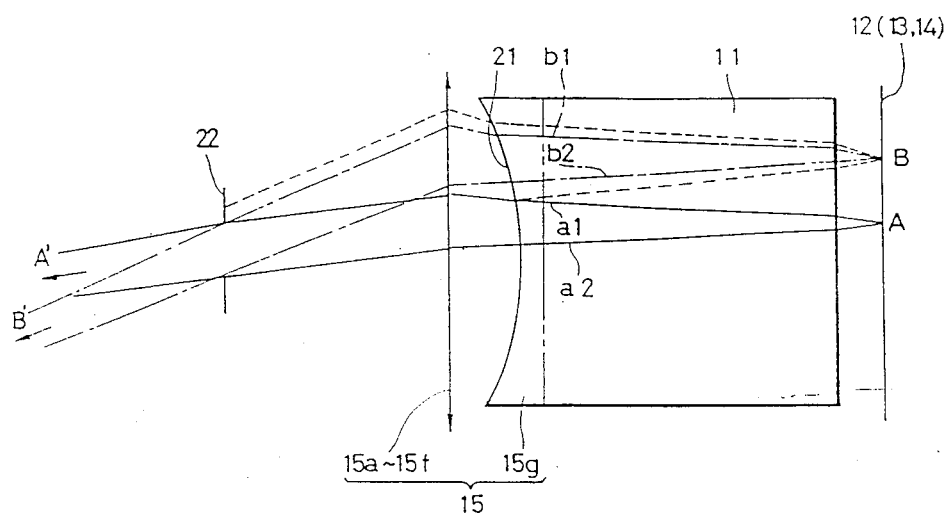
FIG. 3 illustrates the effectiveness of preventing low contrast conventional components the present invention.

With the above-described arrangement in which the end surface of the dichroic prism 11 which is closer to the screen 20 is defined by a curved surface, it is possible to prevent generation of a ghost image due to the surface reflection at the dichroic prism 11 and hence prevent a low contrast projected image. The reason for this will be explained below with reference to FIG. 3 which corresponds to FIG. 5, which shows surface reflection in the prior art image projector.

Assuming that the upper and lower light rays of a bundle of rays (shown by the solid line) emerging from the point A on the liquid crystal panel 12 (or 13 or 14) are a1 and a2, respectively, in the same way as in the case of FIG. 5, the reflected light (shown by the dotted line) of the concave surface 21 of the negative lens element 15g reaches the point B on the liquid crystal panel 12 and is reflected again therefrom. The bundle of rays passing through the dichroic prism 11, the projection lens 15 and the stop 22 reaches the screen 20 as shown by the arrow A'. On the other hand, the upper and lower rays b1 and b2 of another bundle of rays (shown by the one-dot chain line) emerging from the point B on the liquid crystal panel 12 reach the screen 20 as shown by the arrow B'. The light rays shown by the one-dot chain line do not have the same optical path as the bundle of rays shown by the dotted line. More specifically, since the emergence surface of the dichroic prism 11 is defined by the concave surface 21, the bundles of rays shown by the one-dot chain line and those shown by the dotted line are caused to diverge from each other by the concave surface 21. Thus, a part of the bundle of rays shown by the broken line is stopped from reaching the screen 20 by the stop 22. In other words, the concave surface 21 serves to diffuse the reflected light rays therefrom and hence prevent generation of a ghost image on the screen 20 and lowering of contrast due to such a ghost image.

Table 1 shows specific examples of the projection lens 15 shown in FIG. 1. FIG. 2 is a graph showing various aberration curves obtained on the object (liquid crystal panel 12) side when the projection lens 15 is used at a magnification of $-15.5\times$. It will be understood from FIG. 2 that it is possible to obtain image (picture) quality adequate for a color projector.

TABLE 1

| f = 1 mm | | | |
|---|---|---|---|
| $r_1$ = 2.44 mm | | | |
| | $d_1$ = 0.025 | $n_1$ = 1.80518 | $v_1$ = 25.4 |
| $r_2$ = −1.25 mm | | | |

TABLE 1-continued

| | f = 1 mm | | |
|---|---|---|---|
| $r_3 = -1.01$ mm | $d_2 = 0.143$ | | |
| | $d_3 = 0.044$ | $n_2 = 1.74950$ | $\nu_2 = 35.3$ |
| $r_4 = 1.01$ mm | $d_4 = 0.219$ | | |
| $r_5 = -0.38$ mm | | | |
| | $d_5 = 0.040$ | $n_3 = 1.80518$ | $\nu_3 = 25.4$ |
| $r_6 = -2.89$ mm | $d_6 = 0.203$ | $n_4 = 1.60311$ | $\nu_4 = 60.7$ |
| $r_7 = -0.47$ mm | $d_7 = 0.006$ | | |
| $r_8 = -3.56$ mm | | | |
| | $d_8 = 0.199$ | $n_5 = 1.51633$ | $\nu_5 = 64.1$ |
| $r_9 = -0.75$ mm | $d_9 = 0.006$ | | |
| $r_{10} = -38.7$ mm | | | |
| | $d_{10} = 0.207$ | $n_6 = 1.51633$ | $\nu_6 = 64.1$ |
| $r_{11} = -1.01$ mm | $d_{11} = 0.006$ | | |
| $r_{12} = 2.28$ mm | | | |
| | $d_{12} = 0.178$ | $n_7 = 1.51633$ | $\nu_7 = 64.1$ |
| $r_{13} = -2.28$ mm | $d_{13} = 0.087$ | | |
| $r_{14} = -1.50$ mm | | | |
| | $d_{14} = 1.050$ | $n_8 = 1.51633$ | $\nu_8 = 64.1$ |
| $r_{15} = \infty$ | | | | f: Focal length
$r_i$: Curvature radius of i surface
$d_i$: Distance between i surface and i + 1 surface
$n_i$: Refractive index of i lens (d-line)
$\nu_i$: Abbe's number of i lens In the embodiment mentioned above, the liquid crystal panels 12 (13, 14) are shown as light transmission type separete color image emitting elements. Alternatively, it is possible to employ self-light emitting type separete color image emitting elements such as CRT's instead of liquid crystal panels 12 (13, 14). Furthermore, the separate images discussed in the present invention is not limited to separate color images but includes separate polarized images.

As has been described above, it is possible according to the projection display device of the present invention to effectively prevent low contrast due to the surface reflection at a surface of the light rays combining optical element. By arranging that the emergence surface of the light rays combining optical element at the side closer to the projection lens is formed into a curved surface reflection is eliminated. In a preferred arrangement a constituent lens element of the projection lens is adhered to the emergence surface of the light rays combining optical element.

We claim:

1. A projection display device comprising a dichroic prism having at least two light incident surfaces and a light emergence surface, separate color image emitting elements disposed opposite said two light incident surfaces of the dichroic prism, a projection lens being disposed opposite said emergence surface of the dichroic prism, wherein color images produced by said separate color image emitting elements are combined by said dichroic prism and projected onto a screen through said projection lens,
  wherein the end surface of said dichroic prism which is closer to said projection lens comprises a curved surface.

2. A projection display device according to claim 1, wherein said curved surface is a concave surface.

3. A projection display device according to claim 1, wherein said separate color image emitting elements comprise liquid crystal panels, and a light source is provided which illuminates said liquid crystal panels.

4. A projection display device according to claim 1, wherein said separate color image emitting elements are CRT's.

5. A projection display device comprising a dichroic prism having at least two light incident surfaces and light emergence surface, separate color image emitting elements disposed opposite to said light incident surfaces of said dichroic prism, a projection lens being disposed opposite said emergence surface of said dichroic prism, wherein color images produced by said separate color image emitting elements are combined by said dichroic prism and projected onto a screen through said projection lens,
  wherein a lens element of said projection lens which is closest to said dichroic prism comprises a lens having a curved surface at the side thereof which is closer to said screen, said lens adhered to the light emergence surface of said dichroic prism.

6. A projection display device according to claim 5, wherein said lens adhered to the light emergence surface of said dichroic prism is a plano-concave lens.

7. A projection display device according to claim 5, wherein said dichroic prism and said lens adhered thereto are made of the same material.

8. A projection display device according to claim 5, wherein said separate color image emitting elements comprise liquid crystal panels, and a light source is provided which illuminates the said liquid crystal panels.

9. A projection display device according to claim 5, wherein said separate color image emitting elements are CRT's.

10. A projection display device comprising a dichroic prism having four surfaces perpendicularly intersecting each other, three of said four surfaces serving as light incident surfaces, and the remaining surface serving as a light emergence surface;
  separate color image emitting elements providing images separated into three colors, said separate color image emitting elements being disposed opposite said three light incident surfaces, respectively, of said dichroic prism;
  a reflecting film provided inside said dichroic prism to combine the light rays entering the dichroic prism through said separate color image emitting elements and to cause the combined light rays to emerge from said light emergence surface; and a projection lens for projecting the light emerging from said light emergence surface of said dichroic prism onto a screen,
  wherein the end surface of said dichroic prism which is closer to said projection lens comprises a curved surface.

11. A projection display device according to claim 10, wherein said three colors are red, green and blue.

12. A projection display device comprising a dichroic prism having four surfaces perpendicularly intersecting each other, three of said four surfaces serving as light surfaces, and the remaining surface serving as a light emergence surface;
  separate color image emitting elements providing images separated into three colors, said separate color image emitting elements being disposed opposite said three light incident surfaces, respectively, of said dichroic prism;

a reflecting film provided inside said dichroic prism to combine the light rays entering said dichroic prism through said separate color image emitting elements and to cause the combined light rays to emerge from said light emergence surface; and a projection lens for projecting the light emerging from said light emergence surface of said dichroic prism onto a screen, wherein a lens element of said projection lens having a curved surface at the side of said lens closer to said screen, said lens being adhered to said light emergence surface of said dichroic prism.

13. A projection display device according to claim 12, wherein said lens that is adhered to said light emergence surface of said dichroic prism is a plano-concave lens.

14. A projection display device according to claim 12, wherein said dichroic prism and said lens adhered thereto are of the same material.

15. A projection display device comprising at least two optical image producing means which produce separate optical images, a light ray combining optical element having at least two incident surfaces upon which said separate images produced by the optical image producing means are incident and one emerging surface from which said separate images combined within the light ray combining optical element emerge, and a projection lens for projecting the light emerging from said emerging surface of said light ray combining optical element onto a screen, wherein the end surface of said light rays combining optical element which is closer to said projection lens comprises a curved surface.

16. A projection display device according to claim 15, wherein said light ray combining optical element is a dichroic prism.

17. A projection display device according to claim 15, wherein said optical image producing means produce three different color images of red, green and blue.

18. A projection display device according to claim 15, wherein said optical image producing means comprise liquid crystal panels and a light source which illuminates said liquid crystal panels.

19. A projection display device comprising at least two optical image producing means which produce separate optical images, a light ray combining optical element having at least two incident surfaces upon which said separate images produced by said optical image producing means are incident and one emerging surface from which said separate images combined within the light rays combining optical element emerge, and a projection lens for projecting the light emerging from the emerging surface of said light ray combining optical element onto a screen, wherein a lens element of said projection lens which is closest to said light ray combining optical element comprises a lens having a curved surface at the side of said lens closer to said screen, said lens being adhered to the emerging surface of said light ray combining optical element.

20. A projection display device according to claim 19, wherein said light ray combining optical element is a dichroic prism.

21. A projection display device according to claim 19, wherein said optical image producing means produce three different color images of red, green and blue.

22. A projection display device according to claim 19, wherein said each optical image producing means comprise liquid crystal panels and a light source which illuminates said liquid crystal panels.

* * * * *

UNITED STATES PATENT AND TRADEMARK OFFICE
CERTIFICATE OF CORRECTION

PATENT NO. : 4,981,352

DATED : January 1, 1991

INVENTOR(S) : TEJIMA et al.

It is certified that error appears in the above-identified patent and that said Letters Patent is hereby corrected as shown below:

In the Abstract of the printed patent, line 2, change "having" to ---with---.

In the Abstract of the printed patent, line 3, change "being" to ---are---.

In the Abstract of the printed patent, line 5, delete "," after "respectively" and "prism".

In the Abstract of the printed patent, line 5, insert "." after "prism".

In the Abstract of the printed patent, line 5, delete "and" after "prism".

In the Abstract of the printed patent, line 5, change "a" to ---A---.

In the Abstract of the printed patent, line 6, change "being" to ---is---.

In the Abstract of the printed patent, line 7, change "," to ---.---.

UNITED STATES PATENT AND TRADEMARK OFFICE
CERTIFICATE OF CORRECTION

PATENT NO. : 4,981,352

DATED : January 1, 1991

INVENTOR(S) : Tejima et al

It is certified that error appears in the above-identified patent and that said Letters Patent is hereby corrected as shown below:

In the Abstract of the printed patent, line 7, change "so that" to ---Thus---.

In the Abstract of the printed patent, line 11, change "said" (1st occurrence) to --the--.

In the Abstract of the printed patent, line 10, change "," to ---.--- after "lens".

In the Abstract of the printed patent, line 10, delete "wherein".

In the Abstract of the printed patent, line 10, change "the" to ---The---.

In the Abstract of the printed patent, line 12, change "comprises" to ---is---.

At column 1, line 29 of the printed patent, insert ---11--- after "prism".

Column 1, line 49, of the printed patent, change "In the" to ---Thus in the conventional---.

Signed and Sealed this

Nineteenth Day of January, 1993

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,981,352

DATED : January 1, 1991

INVENTOR(S) : Y. TEJIMA et al.

It is certified that error appears in the above-identified patent and that said Letters Patent is hereby corrected as shown below:

The title page item [73] Assignee: after "Kaisha" insert ---and CASIO Computer Co., Ltd., both of Tokyo, Japan---.

Signed and Sealed this

Thirteenth Day of April, 1993

*Attest:*

STEPHEN G. KUNIN

*Attesting Officer*    Acting Commissioner of Patents and Trademarks